United States Patent
Roberts

[11] Patent Number: 5,946,874
[45] Date of Patent: Sep. 7, 1999

[54] CONNECTOR ASSEMBLY FOR COPLANAR DISPLAY PANELS

[76] Inventor: Edward A. Roberts, 29050 N. Line Rd., Romulus, Mich. 48150

[21] Appl. No.: 09/053,123

[22] Filed: Apr. 1, 1998

[51] Int. Cl.[6] .................................................. E04C 1/30
[52] U.S. Cl. ............................ 52/464; 52/698; 52/586.1; 52/584.1; 52/655.2; 52/656.9; 52/243; 52/282.2; 49/218; 49/174
[58] Field of Search ................................ 52/282.2, 238.1, 52/239, 243, 281, 581, 584.1, 698, 699, 582.1, 586.1, 585.1, 656.2, 656.9, 655.2, 463, 464; 403/217, 213, 174, 170

[56] References Cited

U.S. PATENT DOCUMENTS

| | | |
|---|---|---|
| 2,208,159 | 7/1940 | Lichtor . |
| 3,823,521 | 7/1974 | Heitholt et al. . |
| 4,005,559 | 2/1977 | Mathou . |
| 4,470,235 | 9/1984 | Jenni . |
| 4,953,338 | 9/1990 | Wilson et al. . |
| 5,097,643 | 3/1992 | Wittler . |
| 5,375,641 | 12/1994 | Schlueter . |

*Primary Examiner*—Christopher T. Kent
*Assistant Examiner*—Yvonne Horton-Richardson
*Attorney, Agent, or Firm*—Charles W. Chandler

[57] ABSTRACT

A pair of metal disks having a central opening for receiving a fastener to sandwich the corners of a plurality of rectangular panels for the temporary erection of display partitions at a trade show, exhibition or entertainment event.

4 Claims, 2 Drawing Sheets

CONNECTOR ASSEMBLY FOR COPLANAR DISPLAY PANELS

BACKGROUND AND SUMMARY OF THE INVENTION

This invention relates to display panels, and particularly to connector assemblies for securing display panels in a coplanar relationship. The invention is especially applicable to the temporary erection of display panels into a partition at a trade show, exhibition, or entertainment event where it is desired to section or subdivide different areas or zones in a large building.

Prior to the present invention various connector assemblies have been devised for connecting panels or structural components together in a removable fashion.

U.S. Pat. No. 4,953,338, issued to M. Wilson et al., shows a display panel arrangement wherein the panel edges are formed by metal extrusions that form slots. The panels are connected together by elongated connector bars that are slidably inserted into the slots.

U.S. Pat. No. 5,097,643, issued to W. Wittler, discloses plastic-coated Styrofoam panels that are connected by interlocking connector strips extending along the panel edges. A bead on one connector strip interlocks with a groove on the mating strip as a snap fit.

U.S. Pat. No. 5,375,641, issued to D. Schlueter, discloses elastic cords and rigid connector rods extending through tubular inserts embedded within display panels, whereby the elastic cords and connector rods hold the panels in upright positions.

U.S. Pat. No. 2,208,159, issued to S. Lichtor, shows detachable wall (or ceiling) panels attachable to the building surface by clip mechanisms that run along the panel edges. In some cases the clip mechanism comprises a connector strip spanning the edges of two abutting panels, an apertured strip embedded in the building surface, and a threaded bolt extending between the two strips.

U.S. Pat. No. 4,005,559, issued to M. Mathow, discloses panel connector strips having right angled surfaces abutting the side and end edges of each panel, and clamping elements spaced along the connector strip for retaining the connector on each panel. A clamping screw extends through each clamping element into a threaded hole in the associated connector strip.

U.S. Pat. No. 4,470,235, issued to A. Jenni, shows an upstanding pillar having slots therein adapted to receive connectors carried by vertical partitions. The pillar can be formed by four angle members having protruding ribs that form spacers. The protruding ribs form radial slots in the pillar surface.

U.S. Pat. No. 3,823,521, issued to J. Heitholt, shows a connector for structural bodies that are to be joined together in a precise relationship. The connector comprises a connector body having an axis and a number of pins or flanges extending away from said axis. The structural bodies have holes or slots adapted to fit onto the pins or flanges to establish a connection between the connector and each structural body.

The present invention is concerned with a connector assembly for temporarily connecting an array of panels together in coplanar relationship to build a partition. The connector assembly can be used to extend the panel area either vertically or horizontally, i.e. to increase the height of a partition and/or the length of the partition, as required for different situations.

In a preferred form of the invention, the connector assembly comprises first and second clamping disks adapted to engage flatwise against major surfaces of the panels. A clamping screw extends through the disks for drawing them toward each other so as to exert compressive forces on the panels. The connector assembly can be quickly and easily applied to the panels, without drilling holes in the panels or otherwise altering the panels to accomplish the panel-connection process.

Further features of the invention will be apparent from the attached drawings and description of a preferred embodiment of the invention.

DESCRIPTION OF A PREFERRED EMBODIMENT OF THE INVENTION

Figure 1:
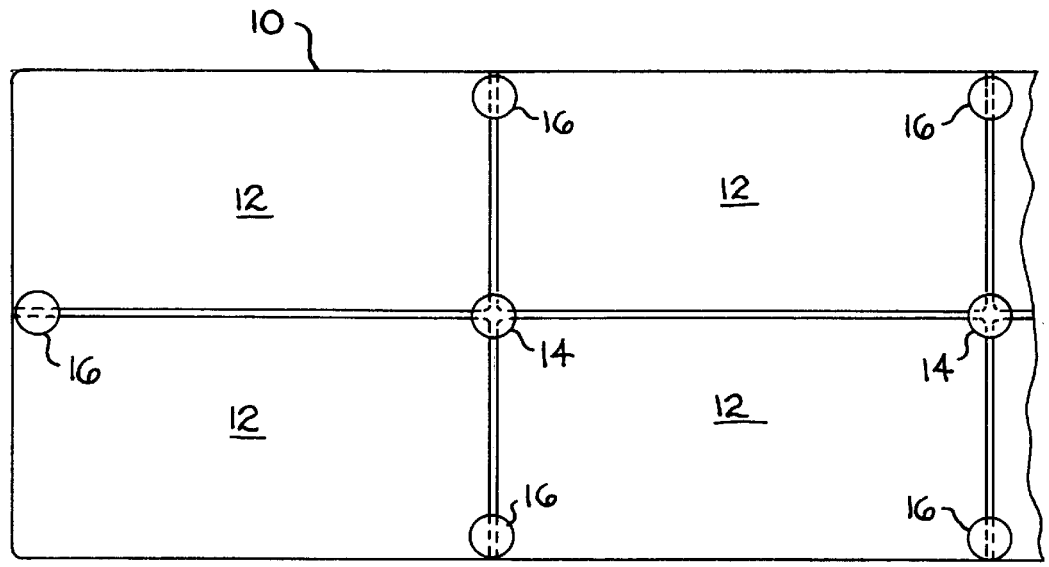
FIG. 1 is a fragmentary elevational view of a temporary building partition formed by using panel connectors embodying the present invention.

FIG. 1 shows an upright building partition 10 formed by connecting together various rectangular panels 12, using connector assemblies 14 and 16 constructed according to the invention. Typically, each panel 12 is flat and has a length of eight feet, a width of four feet, and a thickness of about one-half inch.

Each panel 12 can be formed of various materials, e.g. plywood, pressed board, reinforced sheet plastic, or foam-filled laminated plastic sheet material. Connector assemblies 14 and 16 are releasably attached to the panels to secure them together in a coplanar relationship, e.g. in the plane of the paper in FIG. 1.

As shown in FIG. 1, each connector assembly 14 is used to connect four panels 12 together. Each connector assembly 16 is used to connect two panels 12 together. Connector assemblies 14 are used in the body of partition 10, whereas connector assemblies 16 are used primarily along edge areas of the partition.

The panel-connection procedure is preferably carried out with the panels in prone positions. After the panels have been connected together with connector assemblies 12 and 14, the partition (formed by the connected panels) is raised to the erected vertical condition. Support devices, not shown, may be used to maintain the partition in a vertical position. The erected partition can have any desired height or length, in accordance with the number of panels used.

Figure 2:
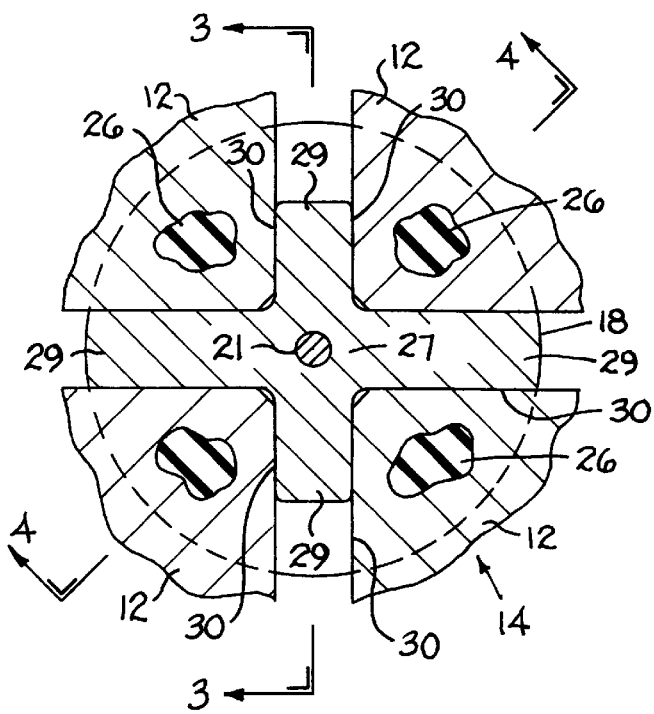
FIG. 2 is an enlarged sectional view taken through one of the panel connector assemblies used to erect the building partition depicted in FIG. 1.
Figure 3:
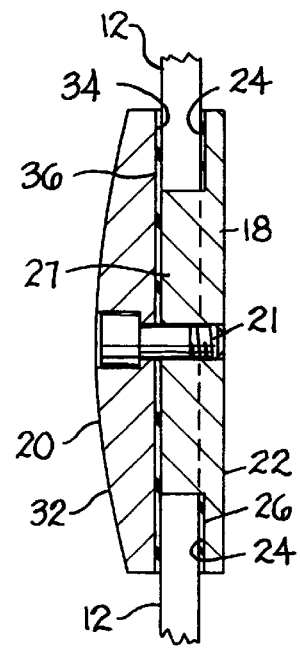
FIG. 3 is a transverse sectional view taken on line 3—3 in FIG. 2.
Figure 4:
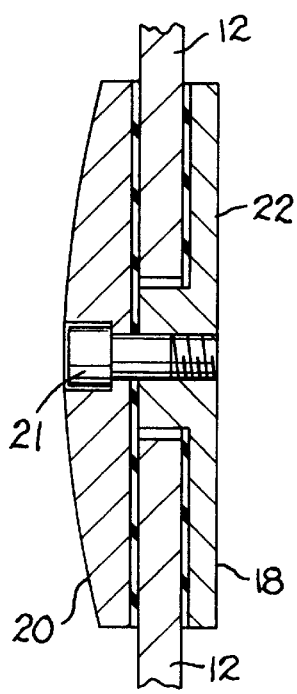
FIG. 4 is a transverse sectional view taken on line 4—4 in FIG. 2.

Connector assembly 14 is shown in greater detail in FIGS. 2 through 4, and comprises first and second disks 18 and 20 formed primarily of a rigid non-deformable material, e.g. cast aluminum or molded rigid plastic.

Each disk has a facing sheet of resilient elastic material adapted to seat flatwise on the major surfaces of the panels 12 that are to be secured together by the connector assembly.

Connector assembly 14 further comprises a clamping screw 21 extendible through aligned holes in disks 18 and 20 to draw them toward each other, whereby the facing elastic sheets are resiliently deformed to exert enhanced frictional attachment forces on the engaged panels. Each elastic sheet is compressed so as to conform intimately to the panel surface. Sheet compression increases the engagement force, preventing the panels 12 from slipping out of the grasp of the connector disks.

Connector disk 18 comprise a non-deformable disk body 22 having flat surfaces 24 adapted to face a major surface of the associated panel 12. Each flat surface 24 has a flat sheet 26 of deformable elastomeric material attached thereto by a suitable adhesive. As shown in FIG. 2, four corner areas of panels 12 are broken away to show the elastomeric sheets 26. Each sheet 26 has a segment configuration adapted to facially engage a corner area of the associated panel 12.

Disk body 22 has a threaded hole adapted to receive the threaded shank of the clamping screw 21. The annular area 27 surrounding this hole is raised to provide a space between the two connector disks 18 and 20 The axial thickness of raised wall area 27 is slightly less than the thickness of panels 12, to provide the necessary slotlike spaces for accommodating corner areas of panels 12.

Disk body 22 further has four linear ribs 29 extending radially from annular raised area 27 to form locator surfaces for the edges of panels 12. Each rib has the same height as annular raised area 27. Each rib 29 has two straight side edges 30 adapted to abut the edges of panels 12 being secured together by the connector assembly. As shown in FIG. 2, the four raised linear ribs 29 have a cross configuration centered on the hole for screw 21, whereby the ribs locate the edges of the four panels 12.

Connector disk 20 comprises a second non-deformable disk body 32 having a single flat surface 34 adapted to face a major surface of each panel 12. A single flat sheet 36, formed of a deformable elastomeric material, is adhesively attached to flat surface 34 so as provide a large gripper surface for the four panels 12. Disk body 32 has a central hole that is aligned with the hole in disk body 22 for accommodating the head of clamping screw 21.

Elastomeric pads or sheets 26 and 36 have deformable gripper surfaces adapted to engage major surfaces of panels 12. Each elastomeric sheet is preferably a medium durometer rubber material having a thickness of about 0.06 thick. The rubber material is deformable under pressure to develop an enhanced gripper action on the panel 12 surface (when clamping screw 21 is tightened).

Figure 8:
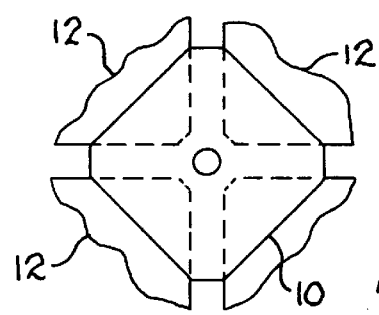
FIG. 8 is an elevational view of an additional panel connector assembly embodying the invention.

As shown in FIGS. 1 and 2, the connector assembly 14 has a circular plan configuration. Typically the diameter of each disk 18 or 20 is about six inches. FIG. 8 shows an alternate functional equivalent configuration, wherein each disk has a generally square plan shape. FIGS. 1 and 2 represent the preferred construction.

Figure 5:
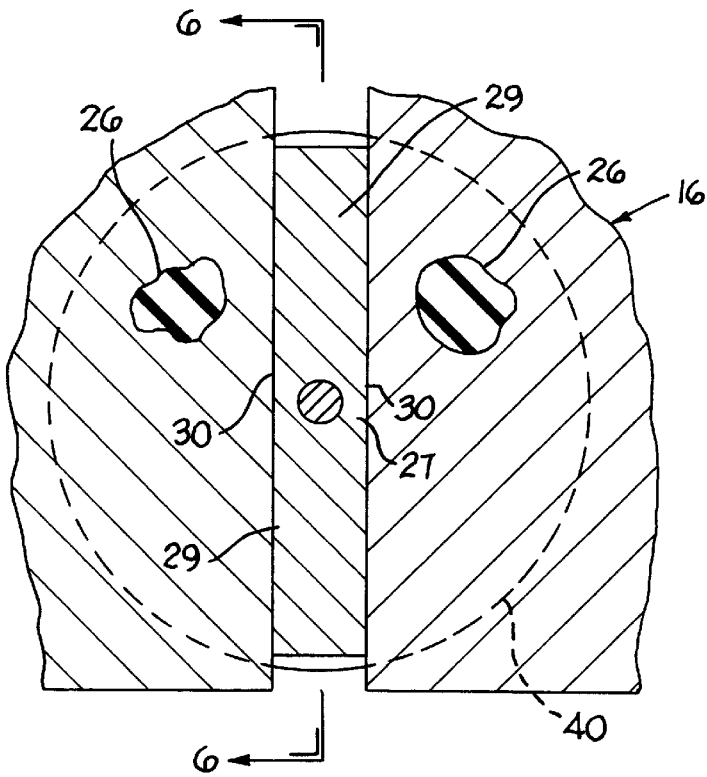
FIG. 5 is an enlarged sectional view taken through a second panel connector assembly used to erect the building partition depicted in FIG. 1.
Figure 6:
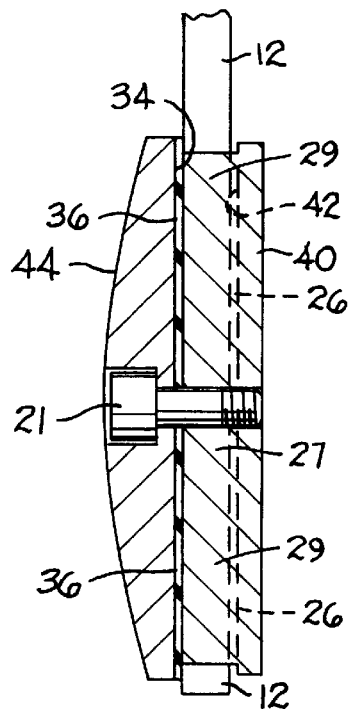
FIG. 6 is a sectional view taken on line 6—6 in FIG. 5.

FIGS. 5 and 6 show in some detail the construction of each panel connector assembly 16. The connector assembly comprises a first non-deformable disk body 40 having two flat surfaces 42 adapted to face major surfaces of the associated panels 12.

An elastomeric sheet 26, of segmental (half-moon) shape, is adhesively attached to each flat surface 42.

Disk body 40 has an annular raised area 27 surrounding the threaded hole for clamping screw 21, and two aligned raised ribs 29 extending in opposite directions from raised area 27 for form locator surfaces for panels 12. Side edges 30 of ribs 29 abut the edges of panels 12 to locate the panels relative to connector assembly 16.

A second disk body 44 is provided for clamping engagement on the other major surfaces of panels 12. Disk body 44 has a single flat surface 34 adapted to face a major surface of each panel 12, and a deformable elastomeric sheet 36 adhesively secured to surface 34. A hole is formed in disk body 44 to accommodate the head of clamping screw 21, whereby the elastomeric sheets 26 and 36 exert gripper forces on panels 12 when the screw is threaded into disk body 40 to a desired torque setting.

Connector assembly 16 functions in essentially the same fashion as previously described connector assembly 14. In each case, the non-deformable disk bodies have elastomeric pads having a suitable thickness (e.g. about 0.06 inch) for producing pad compression and high friction engagement forces with panels 12 when clamping screw 21 is suitably tightened.

Figure 7:
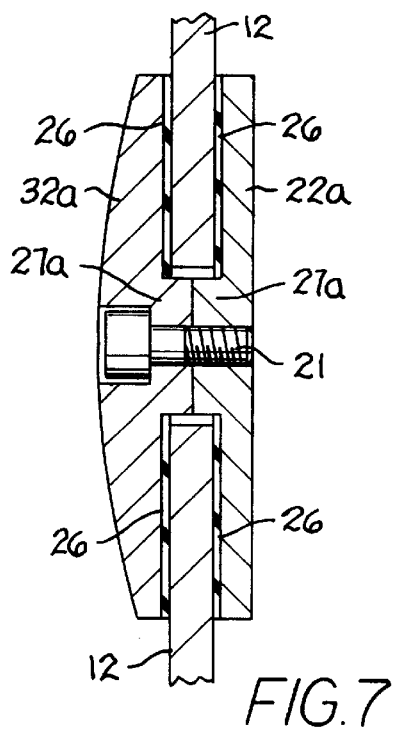
FIG. 7 is a sectional view taken in the same direction as FIG. 4, but illustrating another form that the connector assembly can take.

FIG. 7 shows an alternative disk construction that can be used in the practice of the invention. In this case, each disk has raised wall areas 27a measuring slightly less than one half the panel thickness, such that the combined height of the opposed raised wall areas is sufficient to accommodate the panels; the associated linear ribs have the same thickness as wall areas 27a. With the arrangement depicted in FIG. 7, there are eight segment-shaped elastomeric pads 26 (four pads on each disk body 22a or 32a). The connector assembly of FIG. 7 functions in the same fashion as the connector assembly of FIG. 2.

It will be appreciated that the raised wall feature depicted in FIG. 7 can also be applied to the FIG. 5 connector assembly, to provide a two-panel connector assembly wherein each connector disk has raised wall areas and two segment-shaped elastomeric pads 26, 26.

In each of the illustrated embodiments of the invention the heights of the raised walls 27, 27a, 29, etc. are selected to achieve a satisfactory compression of the elastomeric pads 26 and 36 prior to bottoming of the raised walls against the opposing disk surfaces. Preferably the elastomeric pads have a reasonably low durometer, such that the pads can be compressed a substantial amount before the raised spacer walls 27 and 29 come into contact with the opposed surfaces on disk bodies 32 (or 32a). Assuming a pad thickness of about 0.06 inch, the height of raised spacer walls 27 and 29 (FIGS. 4 and 6) can about 0.03 inch less than the panel 12 thickness, to achieve sufficient compression of the pads before the spacer walls bottom out. The spacer walls can bottom against an opposing elastomeric surface, as shown in FIGS. 4 and 6, or the spacer walls can bottom against metal surfaces, as shown in FIG. 7.

The drawings necessarily show specific embodiments of the invention. However, it will be appreciated that the invention can be practiced in various forms and configurations.

I claim:

1. A connector assembly for releasably securing at least two panels in a coplanar relationship, each panel having a linear side edge, comprising:

a first disk comprising a first disk body formed of a rigid non-deformable material, and a first elastomeric panel means on said first disk body having a first planar gripper surface adapted to seat against one major face of each of said panels;

a second disk comprising a second disk body formed of a rigid, non-deformable material having a second planar gripper surface adapted to seat against another major face of each of said panels;

said disk bodies having aligned central holes adapted to receive a clamping screw;

at least one of said disk bodies having an integral spacer means projecting beyond the associated panel gripper surface, and comprising a raised annular wall surrounding said aligned central hole on said one disk body;

at least one raised linear rib extending from said raised annular wall in a radial direction with respect to said central hole;

said at least one raised linear rib having parallel sides extending at right angles to the planar gripper surface of the associated disk, said parallel sides being adapted to abut the linear opposed side edges of a pair of co-planar panels having spaced side edges that are to be secured by the connector assembly, on opposite sides of said linear rib; and a clamping screw means extending through said aligned holes for drawing said disks toward one another with the side edges of the panels sandwiched between said disks in abutment with the parallel sides of said linear ribs.

2. A connector assembly as defined in claim 1, including a second raised linear rib extending from said raised annular wall in a radial direction from said central hole and at right angles with respect to said first mentioned raised linear rib, the second raised linear rib having parallel sides extending at right angles to the gripper surface of the associated disk, said parallel sides being adapted to abut a second linear edge of a pair of panels that are being secured by the connector assembly, on opposite sides of said second rib, whereby, the disks support the pair of panels in a position between the ribs in which a corner of each of said panels is in abutment with sides of both of said linear ribs.

3. The connector assembly of claim 1 wherein there are four raised linear ribs on said first disk body.

4. The connector assembly of claim 1, wherein said first elastomeric pad means comprises multiple elastomeric sheets adhesively secured to said first disk body in segmental spaces formed between said raised linear ribs;

said second elastomeric pad means comprising a single elastomeric sheet adhesively secured to said second disk body so as to be parallel with said multiple elastomeric sheets when said clamping disks are in position on the panels that are to be secured by the connector assembly.

* * * * *